M. F. BEEBE.
ANTIVERMIN PERCH.
APPLICATION FILED APR. 4, 1919.

1,347,930.

Patented July 27, 1920.

Inventor.
M. F. Beebe.
By
Attorney.

UNITED STATES PATENT OFFICE.

MARY F. BEEBE, OF CARTHAGE, ILLINOIS.

ANTIVERMIN-PERCH.

1,347,930.     Specification of Letters Patent.     Patented July 27, 1920.

Application filed April 4, 1919. Serial No. 287,520.

*To all whom it may concern:*

Be it known that I, MARY F. BEEBE, a citizen of the United States, residing at Carthage, in the county of Hancock and State of Illinois, have invented certain new and useful Improvements in Antivermin-Perches; and I do hereby declare the following to be a full, clear, and exact description of the invention, such as will enable others skilled in the art to which it appertains to make and use the same.

This invention relates to perches for poultry and the like, and the primary object of the invention is to provide an improved perch, so constructed, as to receive a disinfectant, so that the fumes therefrom will effectively kill and drive all vermin from the fowls.

Another object of the invention is to provide a hollow perch adapted to contain an insecticide and the hollow perch having a perforated cover, upon which the fowls are adapted to roost, the perforations allowing the fumes from the insecticide to penetrate the plumage of the fowls and thereby effectually kill all vermin which generally infest fowls and the like.

A further object of the invention is to provide an improved perch of the above character which is of exceedingly simple and durable construction, having an improved means for connecting the lid to the body of the perch so that the rusting of these parts is obviated.

A still further object of the invention is to provide an improved anti-vermin perch of the above character, which can be manufactured and placed upon the market at a low price.

With these and other objects in view, the invention consists in the novel construction, arrangement and formation of parts, as will be hereinafter more specifically described, claimed and illustrated in the accompanying drawings, forming a part thereof, in which:

Figure 1:
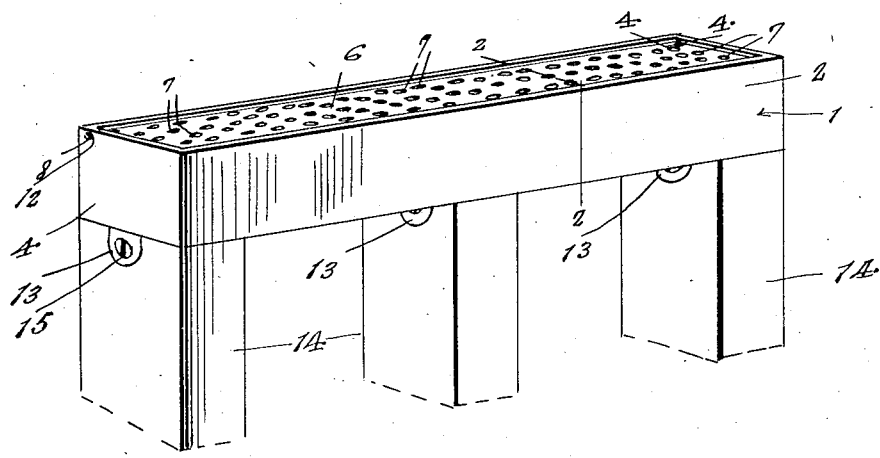
Figure 1 is a perspective view of the improved poultry perch.
Figure 2:
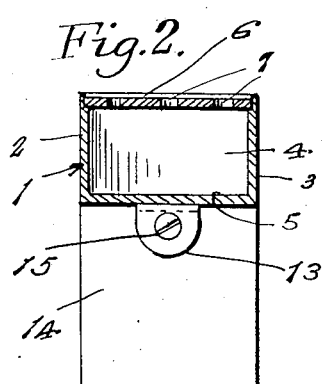
Fig. 2 is a transverse section taken on the line 2—2 of Fig. 1.
Figure 3:
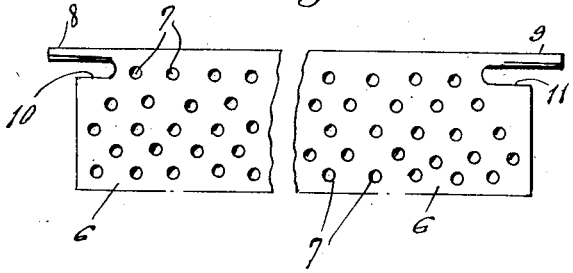
Fig. 3 is a plan view of the cover.
Figure 4:
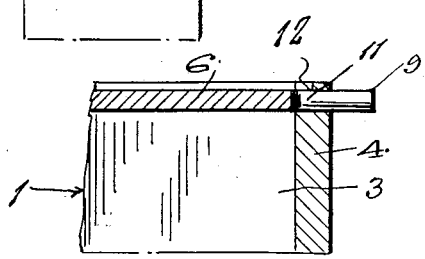
Fig. 4 is a detail section taken on the line 4—4 of Fig. 1.

Referring to the drawings in detail, wherein similar reference characters designate corresponding parts throughout the several views, the numeral 1 generally indicates the improved perch, which includes a substantially elongated rectangular receptacle 2 made from galvanized iron or like material and includes front and rear walls 3, the end walls 4, and bottom wall 5. This receptacle is adapted to receive a suitable insecticide, the fumes of which are adapted to penetrate the plumage of the fowls roosting upon the perch and kill the vermin on the fowls. A lid 6 is provided for closing the open top of the receptacle and the same is provided with a plurality of apertures 7 through which is adapted to percolate the fumes of the fluid contained in the receptacle. The sides of the lid 6 at the rear ends thereof are provided with outwardly extending ears 8 and 9, and inwardly extending slots 10 and 11. The slot 11 and the ear 9 are preferably longer than the ear 8 and the slot 10, so that the cover may be readily placed in position. The end walls 4 are provided with apertures 12 for the reception of the ears and in placing the cover in position, the ear 9 is inserted in one of the apertures and the lid is then moved over until the ear is fully inserted into the recess, at which time the apertured ear 8 is inserted in the other recess 12 and the lid is then moved over into correct position. This construction forms an exceedingly simple and durable means for connecting the lid to the receptacle. The upper edges of the front, rear and end walls are rabbeted as at 16 for receiving the cover 6.

The bottom wall 5 is provided with depending ears 13, which are adapted to engage the side supporting posts 14 and the ears 13 are apertured and suitable fastening elements 15 are driven through the apertures and into the posts 14 which effectively supports the perch in position.

From the foregoing description it can be seen that an improved perch is provided which is so constructed as to contain a suitable insecticide which will penetrate through the plumage of the roosting fowls and thus destroy all vermin which may be upon the fowls.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

A poultry roost comprising an elongated substantially rectangular open receptacle having the inner surface of its upper edge rabbeted, a perforated cover adapted to rest on the shoulders, formed by said rabbeted portion, outwardly extending ears formed on the side edges of the cover at the rear edge thereof extending in direct alinement with the rear edge, one of said ears being longer than the other, the cover having inwardly extending slots formed therein adjacent to the ears, said slot adjacent the relatively long ear being formed relatively longer than the other slot, the end walls of the receptacle being provided with openings to receive the same, as and for the purpose specified.

In testimony whereof I affix my signature in presence of two witnesses.

Mrs. MARY F. BEEBE.

Witnesses:
 SADIE NELSON,
 IVA NELSON.